(12) United States Patent
Seo

(10) Patent No.: US 6,246,644 B1
(45) Date of Patent: Jun. 12, 2001

(54) OPTICAL PICKUP AND METHOD FOR MANUFACTURING OPTICAL PICKUP

(75) Inventor: Katsuhiro Seo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/098,869

(22) Filed: Jun. 17, 1998

(30) Foreign Application Priority Data

Jun. 20, 1997 (JP) ...................................... 9-163933

(51) Int. Cl.$^7$ ........................................................ G11B 7/12
(52) U.S. Cl. .................................... 369/44.23; 369/112.23
(58) Field of Search ............................ 369/44.23, 44.32; 359/719

(56) References Cited

U.S. PATENT DOCUMENTS 4,293,944 * 10/1981 Izumita et al. ..................... 369/44.23
4,731,527 * 3/1988 Nomura et al. .................... 369/44.23
4,812,638 * 3/1989 Ogata et al. ....................... 369/44.23
5,684,641 * 11/1997 Tanaka et al. ................. 359/719 OR

* cited by examiner

Primary Examiner—Aristotelis M. Psitos
(74) Attorney, Agent, or Firm—Oblon, Spivak, McClelland, Maier & Neustadt, P.C.

(57) ABSTRACT

An optical pickup minimizing the modulation caused on the focus error signal by grooves/lands or a train of pits, and implementing a stable focus servo operation. In an optical pickup adapted to obtain focus error information by means of an astigmatism system, the arranging state of an objective lens (5) is set so that a direction (DOB) of an astigmatism generated by the objective lens (5) will be a direction in a predetermined angle range with respect to a direction (DSD) of an astigmatism generated by an astigmatism generating element e.,g (cylindrical lens (7)). The predetermined range is an angle range of ±50° with respect to the direction (DSD) of the astigmatism.

14 Claims, 8 Drawing Sheets

28

F I G. 3A
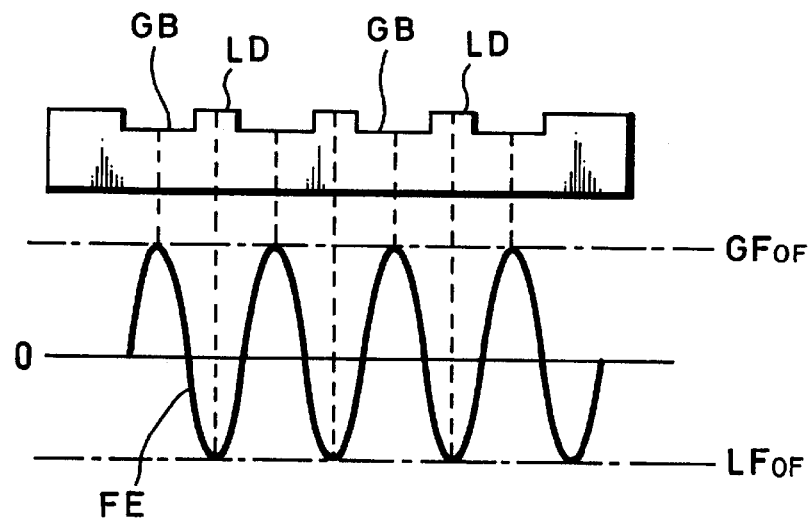
F I G. 3B
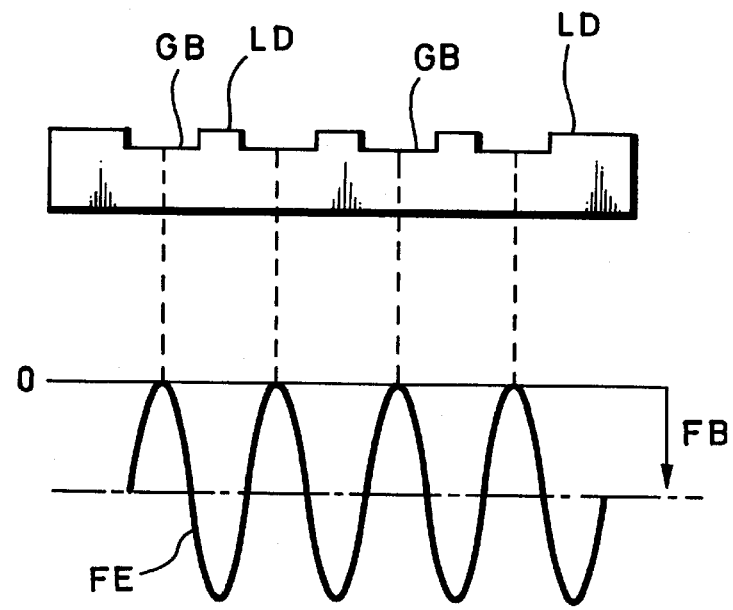

OPTICAL PICKUP AND METHOD FOR MANUFACTURING OPTICAL PICKUP

BACKGROUND OF THE INVENTION

The present invention relates, in particular, to an optical pickup for generating focus error information by using an astigmatism system and a method for manufacturing the optical pickup.

In an optical pickup used in an optical disk reproducing apparatus or the like, not only information recorded on a disk is reproduced from reflected light information, but also error information such as focus, tracking or the like for precise recording/reproducing scan of a laser beam can be obtained.

In particular, error information (focus error signal) for executing a focus servo which brings the focus position of a laser light into an in-focus state with respect to a recording face of a disk or the like is obtained by means of an astigmatism system using the output of a quadruple photo-detector. Such a configuration is known.

FIG. 1 shows an example of a configuration of an optical pickup disk 20.

This optical pickup 20 includes a laser diode 22, a collimator lens 23, a beam splitter 24, an objective lens 25, a condensing lens 26, a cylindrical lens 27, a photodetector 28, and a biaxial mechanism 29.

A laser beam output from the laser diode 22 is converted to a parallel beam by the collimator lens 23, then reflected toward a disk 90 by 90 degrees by the beam splitter 24, and irradiated on the disk 90 via the objective lens 25.

The objective lens 25 is held by the biaxial mechanism 29 so as to be able to move in the focus direction and the tracking direction. The operations for moving the objective lens 25 in the focus direction and the tracking direction are executed by currents applied to a focus coil and a tracking coil in the biaxial mechanism 29.

On the, disk 90, grooves GB are formed as recording tracks. However, both lands LD and grooves GB can be used as the data recording tracks.

A reflected light resulting from reflection on the disk 90 enters the beam splitter 24 via the objective lens 25. The reflected light is then transmitted through the beam splitter 24 as it is and arrives at the condensing lens 26. The reflected light is condensed by the condensing lens 26, and then is incident on the photodetector 28 via the cylindrical lens 27. As the photodetector 28, a quadruple detector having light receiving faces A, B, C and D as shown in FIGS. 2A to 2C is provided.

The cylindrical lens 27 is disposed so as to have its mother line inclined by 45 degrees with respect to the track direction of the disk 90. By utilizing the astigmatism generated by the cylindrical lens 27, the focus error signal is detected from the output of the quadruple detector.

When the beam spot is in the in-focus state with respect to the recording face of the disk 90, a spot SP on the quadruple detector becomes a circle as shown in FIG. 2A.

If the objective lens 25 is located too near the disk 90 as compared with the position of the in-focus state, however, the spot SP on the quadruple detector becomes an ellipse having its longer radius in a direction parallel to the mother line direction of the cylindrical lens 27 (i.e., direction directed from the light receiving face B toward the light receiving face D) as shown in FIG. 2B. On the contrary, if the objective lens 25 is located too far from the disk 90 as compared with the position of the in-focus state, the spot SP on the quadruple detector becomes an ellipse having its longer radius in a direction parallel to a direction perpendicular to the direction of the mother line of the cylindrical lens 27 (i.e. direction directed from the light receiving face A toward the light receiving face C) as shown in FIG. 2C.

Denoting outputs corresponding to quantities of light received by the light receiving faces A, B, C and D respectively by SA, SB, SC and SD, therefore, a focus error signal FE can be obtained as

FE=(SA+SC)−(SB+SD).

In other words, if (SA+SC)−(SB+SD) is zero, it can be detected that the objective lens 25 is in the just focus state. If (SA+SC)−(SB+SD) is a positive value, it can be detected that the objective lens 25 is located further apart from the disk 90 than the in-focus position. If (SA+SC)−(SB+SD) is a negative value, it can be detected that the objective lens 25 is located nearer the disk 90 than the in-focus position.

By constructing the focus servo system so as to converge the focus error signal FE toward zero, therefore, the focus position of the objective lens 25 can be controlled properly.

On the recording face of the recording medium, however, a series of pits formed of concave-convex pits or lands/grooves as in the above described disk 90 are formed. The irradiated laser light is modulated by them. As a result, the intensity pattern of the spot on the quadruple detector is changed. For example, the light intensity of the light spot on the receiving portions A and C becomes intense. Or on the contrary, the light intensity of the light spot on the receiving portions B and D becomes intense.

Therefore, there occurs such a phenomenon that the focus error signal FE becomes plus in, for example, the grooves GB, and becomes minus in the lands LD (or vice versa).

FIG. 3A shows an example of the focus error signal FE obtained when the laser spot traverses the grooves GB/lands LD while being kept in the in-focus state.

In the in-focus state, the focus error signal should originally become constant (zero) irrespective of the grooves GB/lands LD (or irrespective of concave-convex pit train). Due to modulation conducted by the grooves GB/lands LD, the focus error signal FE becomes a signal having an offset GFOF caused by the grooves GB and an offset LFOF caused by the lands LD as illustrated.

In other words, the relation that the focus error signal FE=0 does not necessarily indicate the in-focus state. Unless some countermeasure is taken, the focus servo does not function satisfactorily.

For example, in the case of such a system that information recording and reproducing are conducted only for either the grooves GB or the lands LD, the focus error signal FE is provided with a bias so as to cancel either the offset GFOF caused by the grooves GB or the offset LFOF caused by the lands LD. By doing so, the focus servo system converging to the in-focus state with the focus error signal FE=0 functions normally.

For example, in an example shown in FIG. 3B, the function of the focus servo loop for the grooves GB is made effective by giving a focus bias FB to the focus error signal FE so as to cancel the offset GFOF caused by the grooves GB.

In the case where the grooves GB/lands LD are traversed, however, the modulated signal becomes as illustrated. The larger the degree of modulation caused by the grooves GB/lands LD, therefore, the more the stability of the focus servo loop is hampered, resulting in a problem.

Furthermore, in recent years, there has been proposed a system using both the grooves GB and the lands LD as the recording and reproducing tracks for the purpose of increasing the recording capacity.

In the case of such a system, the servo function cannot be made effective by some fixed focus bias. Therefore, such a sophisticated and difficult control as to change over the focus bias according to whether the laser spot is currently in the grooves GB or in the lands LD is needed.

In other words, the following offset changeover processing is conducted. In the case where the focusing is conducted with respect to the lands LD, a focus bias for land for canceling the offset LFOF is given to the focus error signal FE. In the case where the focusing is conducted with respect to the grooves GB, a focus bias for grooves for canceling the offset GFOF is given to the focus error signal FE.

From these problems, it is demanded to make the degree of modulation caused on the focus error signal by the grooves GB/lands LD (or the degree of modulation caused on the focus error signal by a pit train) as small as possible. For example, in the system using either grooves or lands as the recording and reproducing tracks, it is demanded to minimize the stability hampering when a track is transversed. Furthermore, in the system using both lands and grooves as the recording and reproducing tracks, it is demanded to make the degree of modulation caused on the focus error signal by the grooves GB/lands LD, i.e., the offset difference, as small far as possible, and thereby make possible focus servo control to some degree without necessarily changing over the focus bias.

SUMMARY OF THE INVENTION

In view of the above described problems, an object of the present invention is to minimize the modulation caused on the focus error signal by grooves/lands or a train of pits, and implement a stable focus servo operation.

In an optical pickup adapted to obtain focus error information by means of an astigmatism system, therefore, the arranging state of an objective lens is set so that a direction of the astigmatism generated by the objective lens will be a direction in a predetermined range with respect to a direction of the astigmatism generated by an astigmatism generating element.

The predetermined range is, for example, an angle range of ±50° with respect to the direction of the astigmatism generated by the astigmatism generating element.

As an optical pickup manufacturing method, the astigmatism of a manufactured objective lens is measured, an arranging direction of the objective lens is determined so that the direction of the astigmatism will be a direction in a predetermined range with respect to the direction of the astigmatism generated by the astigmatism generating element set in the optical pickup, and the objective lens is attached and fixed.

As an optical pickup manufacturing method, a metal die for manufacturing the objective lens by means of molding is prepared so as to form a marking portion indicating a direction of astigmatism of an objective lens on the objective lens. The objective lens manufactured by the metal die is attached and fixed by using the marking portion as a guide so that the direction of the astigmatism of the objective lens will be a direction in a predetermined range with respect to the direction of the astigmatism generated by the astigmatism generating element set in the optical pickup.

Such a phenomenon that the focus error signal generated by the astigmatism system is modulated by the lands/grooves or a train of pits intensely depends upon the magnitude and the direction of the astigmatism of the optical system. In other words, the degree of modulation of the focus error signal caused by grooves and/or lands becomes its maximum (i.e., the worst influence is exerted upon the stability of the focus servo), in the case where the above direction of the astigmatism in the range from the light source to the recording medium is made perpendicular to the direction of the astigmatism generated by astigmatism generation elements such as the cylindrical lens and so on. On the contrary, in the case where the above directions are aligned, the degree of modulation becomes its minimum (i.e., the influence exerted on the focus servo becomes favorable).

As for the astigmatism of the optical system itself, the astigmatism of the objective lens becomes a dominant factor.

In the present invention, therefore, the direction of astigmatism generated by an astigmatism generating element such as a cylindrical lens or the like used to generate a focus error signal by means of an astigmatism system and the direction of astigmatism of an objective lens represented as astigmatism possessed by the optical system itself are arranged so as to bring about the best state from the viewpoint of the degree of modulation of the focus error signal caused by the lands/grooves.

Furthermore, as a method for this arrangement, measurement of the astigmatism of the objective lens and marking of the astigmatism direction are conducted.

BRIEF DESCRIPTION OF THE DRAWINGS

FIGS. 3A and 3B are schematic diagrams of focus offset caused by lands/grooves;

DETAILED DESCRIPTION OF THE PREFERRED EMBODIMENTS

Hereafter, an embodiment of an optical pickup according to the present invention will be described by referring to FIGS. 4A to 8.

Figure 4A:
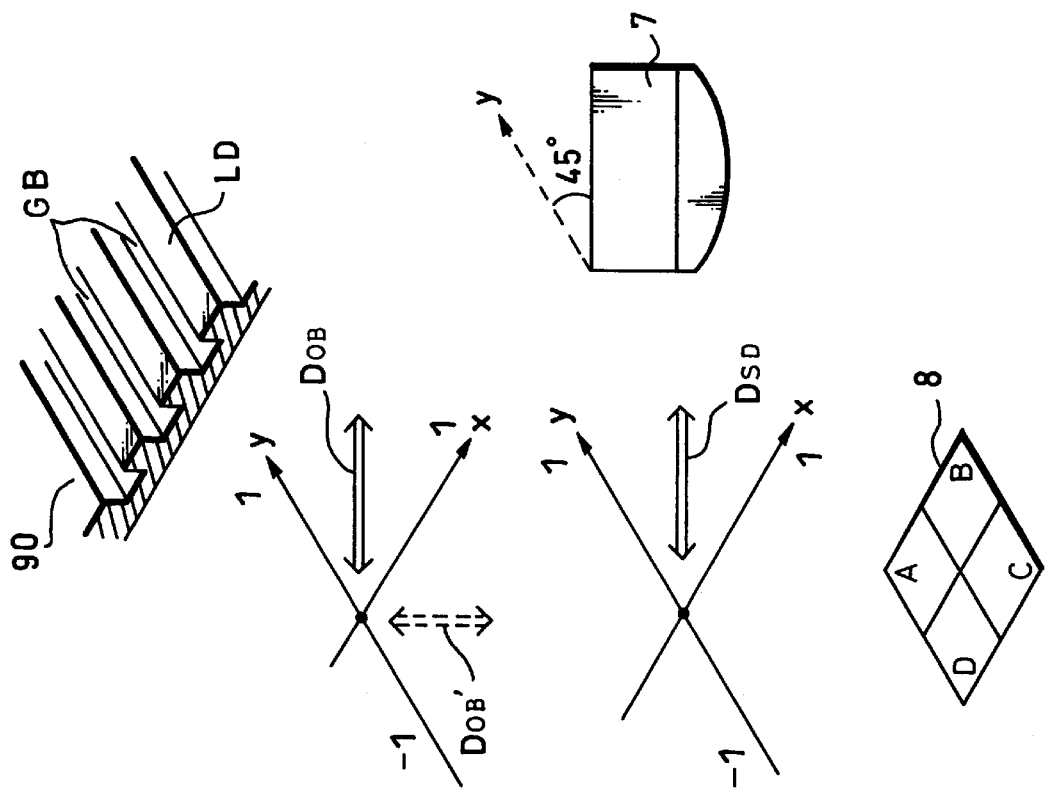
FIGS. 4A and 4B are schematic diagrams of the configuration of an embodiment of the optical system according to the present invention.
Figure 4B:
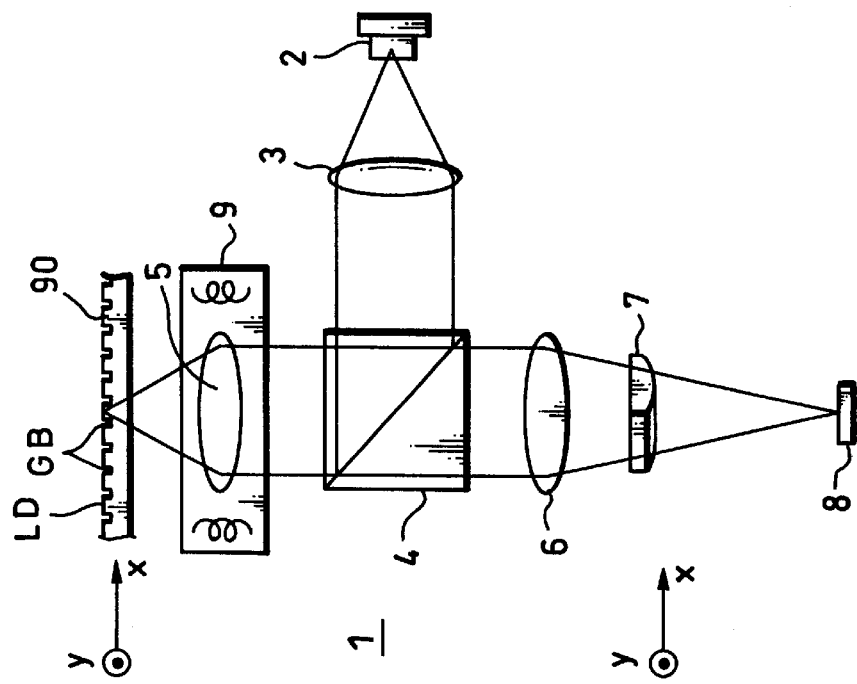

FIG. 4A shows the configuration of an optical system of an optical pickup according to the present embodiment. FIG. 4B schematically shows the position relation of the astigmatism direction and so on.

As shown in FIG. 4A, an optical pickup 1 of the present embodiment includes a laser diode 2, a collimator lens 3, a beam splitter 4, an objective lens 5, a condensing lens 6, a cylindrical lens 7, a photodetector 8, and a biaxial mechanism 9.

A laser beam emitted from the laser diode 2 is converted to a parallel beam by the collimator lens 3, and then made incident upon the beam splitter 4. The incident light is reflected toward a disk 90 by the beam splitter 4, and irradiated on a recording face of the disk 90 via the objective lens 5.

The objective lens 5 is held by the biaxial mechanism 9 so as to be able to move to lens 5 the focus direction and the tracking direction. The operation for moving the objective lens 5 in the focus direction and the tracking direction is executed by currents applied to a focus coil and a tracking coil in the biaxial mechanism 9.

In other words, a servo drive signal is generated by the operation of a focus servo system on the basis of a focus error signal. By a drive current applied to the focus coil in the biaxial mechanism 9, the objective lens 5 is moved in such a direction that the objective lens 5 approaches the disk 90 or in such a direction that the objective lens 5 goes away from the disk 90.

Furthermore, a servo drive signal is generated by the operation of a tracking servo system on the basis of a tracking error signal. By a drive current applied to the tracking coil in the biaxial mechanism 9, the objective lens 5 is moved in such a direction that the objective lens 5 traverses a track of the disk 90.

On the disk 90, a groove GB and a land LD is formed as a recording track. Both the land LD and the groove GB can be used as the recording tracks. For each disk recording and A reproducing system, however, it is stipulated as its disk format that either the groove GB or the land LD are used as the recording track. Alternatively both the lands LD and the grooves GB are used as the recording track.

The optical pickup of the present embodiment is suitable for even a disk in which lands/grooves are not provided but a train of pits using embossed pits is formed.

The laser light irradiated from the objective lens 5 is reflected on the recording face of the disk 90. The reflected light enters the beam splitter 4 again via the objective lens 5. The reflected light is then transmitted through the beam splitter 4 as it is, and arrives at the condensing lens 6. The reflected light is condensed by the condensing lens 6, and then made incident on the photodetector 8 via the cylindrical lens 7.

As the photodetector 8, a quadruple detector having light receiving faces A, B, C and D as shown in FIG. 4B is provided.

The cylindrical lens 7 is disposed so as to have its mother line inclined by 45 degrees with respect to the track direction of the disk 90. By utilizing the astigmatism generated by the cylindrical lens 7, the focus error signal is detected from the output of the quadruple detector.

Figure 1:
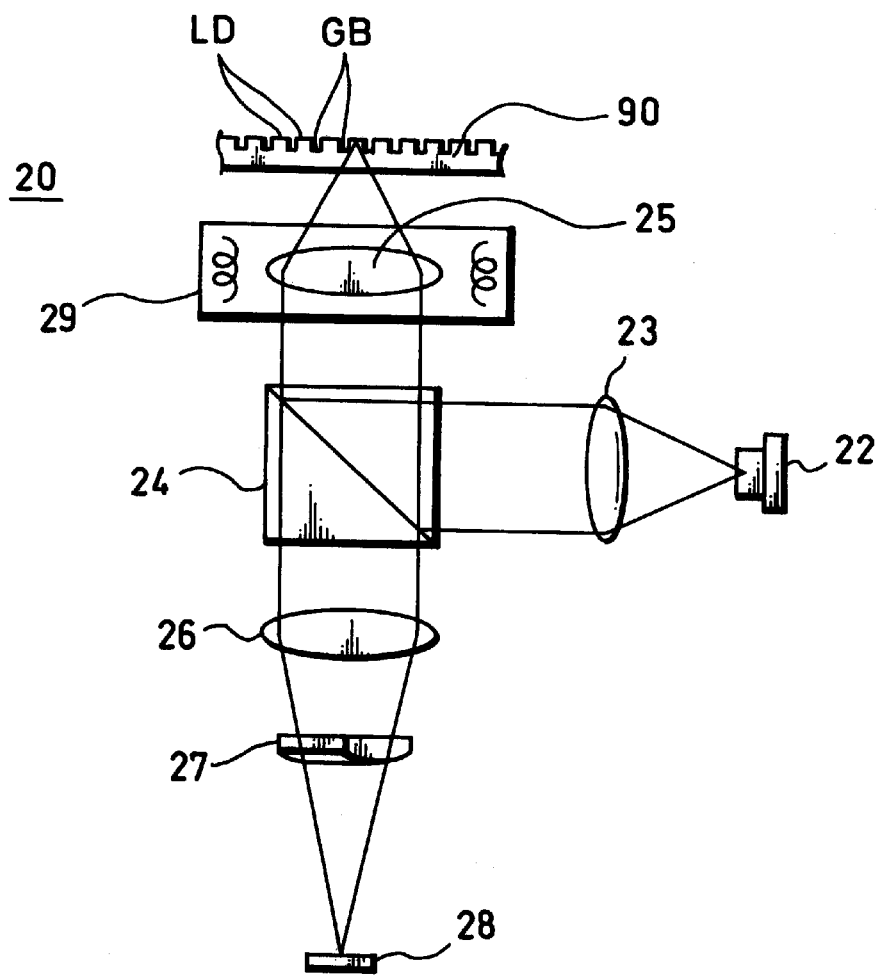
FIG. 1 is a schematic diagram of the configuration of an optical pickup.
Figure 2A:
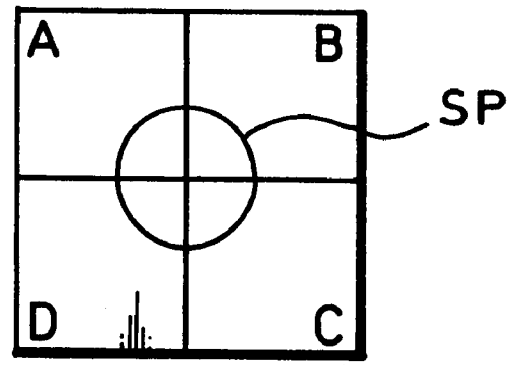
FIGS. 2A to 2C are schematic diagrams of focus servo by using an astigmatism system.
Figure 2B:
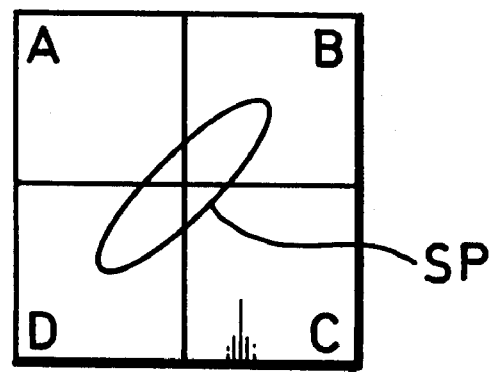
Figure 2C:
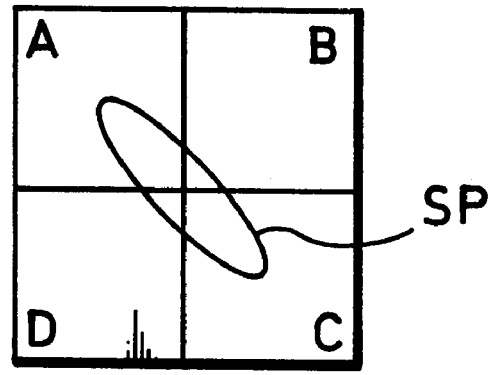

The operation for generating the focus error signal of the astigmatism system is the same as that described with referring to FIGS. 2A to 2C. The operation will not be described repetitively. Denoting outputs corresponding to quantities of light received by the light receiving faces A, B, C and D of the photodetector 8 respectively as SA, SB, SC and SD, a focus error signal FE can be obtained as

FE=(SA+SC)−(SB+SD).

Here, arrangement position relations of the optical system will be described.

In FIG. 4A, a lateral direction thereof is illustrated as an x axis, and a direction proceeding to the rear side of the sheet of the drawing at right angles to the sheet of paper is shown as a y axis. On the other hand, FIG. 4B represents the position relations on the basis of the illustrated x axis and y axis.

The y axis direction is a direction in which a track (groove GB or lands LD) of the disk 90 proceeds. As understood clearly from FIG. 4B, the cylindrical lens 7 is disposed so as to have its mother line inclined by 45 degrees with respect to the track direction (y axis direction) of the disk 90. In other words, a center line of the cylinder of the cylindrical lens 7 becomes a line parallel to a direction (1, −1) represented in the x-y plane. Therefore, the cylindrical lens 7 has a focal power only in a direction (1, 1), but has no power in the direction (1, −1).

Instead of a single focus plane, therefore, two focal planes are present. By disposing a quadruple detector nearly midway between the two focal planes, a focus error signal of the astigmatism system can be obtained.

As against the fact that the direction DSD of the astigmatism of the cylindrical lens 7 becomes the direction (1, −1), the direction of astigmatism generated by the optical system (i.e., the optical system ranging from the laser diode 2 to the disk recording face) is set in the present embodiment. Thereby, the influence of modulation conducted on the focus error signal by the lands/grooves is minimized.

Such a phenomenon that the focus error signal generated by the astigmatism system is modulated by the lands LD/grooves GB intensely depends upon the magnitude and the direction of the astigmatism of the optical system. In the case where the direction of the astigmatism from the light source to the recording medium is made perpendicular to the direction of the astigmatism generated by astigmatism generation elements such as the cylindrical lens or the like, the degree of modulation of the focus error signal caused by grooves and/or lands becomes its maximum. On the contrary, in the case where both the directions are aligned, the degree of modulation becomes its minimum.

Each of the optical elements of the optical system has astigmatism to some extent. As for the astigmatism as a whole, the astigmatism of the objective lens 5 becomes a dominant factor. In almost all cases, it may be safely said that the astigmatism of an optical system is the astigmatism of the objective lens.

By thus considering, the degree of modulation becomes its maximum when the direction of the astigmatism of the objective lens 5, is a direction DOB' on the x-y plane indicated by broken line arrows in FIG. 4B, i.e., the direction of the astigmatism of the objective lens 5 is a direction perpendicular to the direction DSD of the astigmatism of the cylindrical lens 7. On the other hand, in the case where the direction of the astigmatism of the objective lens 5 is aligned with a direction DOB on the x-y plane indicated by solid line arrows, i.e., the direction DSD of the astigmatism of the cylindrical lens 7, the degree of modulation becomes its minimum.

In other words, by measuring the direction of the astigmatism with respect to the objective lens 5, and disposing the objective lens 5 so as to make the direction of the astigmatism of the objective lens 5 same as the direction (1, 1) on the x-y plane in the same way as the cylindrical lens 7, the influence of the lands/grooves on the focus error signal becomes the minimum, and a stable focus servo operation is implemented.

Figure 5:
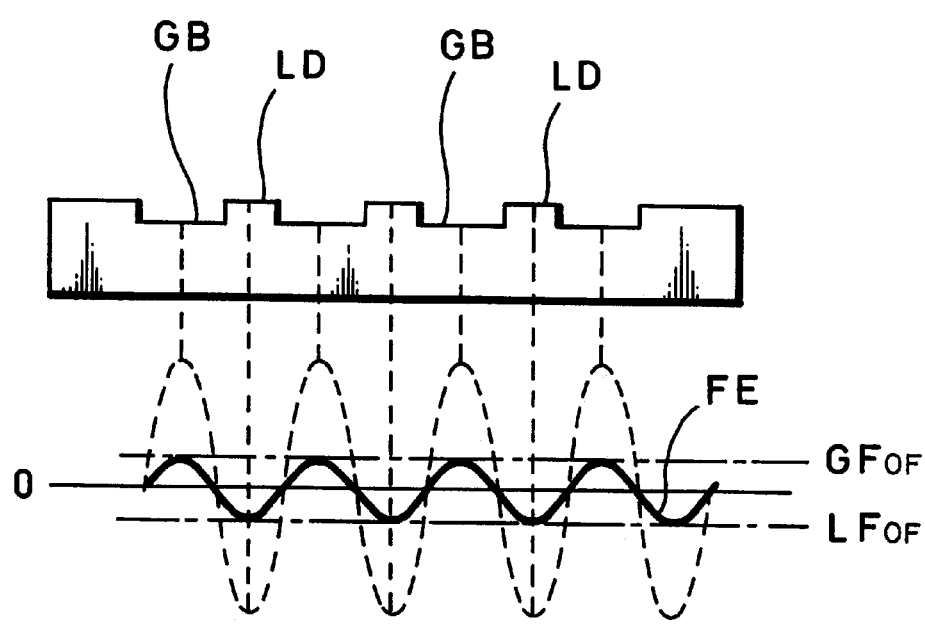
FIG. 5 is a schematic diagram of focus offset caused by the embodiment of the optical system.

In the case where the direction of the astigmatism of the objective lens 5 is made to be the direction DOB on the x-y plane, the focus error signal FE obtained when the laser spot traverses the grooves GB/lands LD while being kept in the in-focus state is shown in FIG. 5.

For the purpose of comparison, the above described focus error signal shown in FIG. 3A is illustrated by a broken line.

By the lands LD/grooves GB of the disk 90, the irradiated laser light is modulated. As a result, the intensity pattern of the spot on the quadruple detector is changed. Therefore, there occurs such a phenomenon that the focus error signal FE becomes plus in, for example, the grooves GB, and becomes minus in the lands LD (or vice versa) as described before. By setting the arrangement of the objective lens 5 according to the direction of the astigmatism thereof as in the present embodiment, however, an offset GFOF caused on the focus error signal FE by the grooves GB and an offset LFOF caused on the focus error signal FE by the lands LD can be made small in level as illustrated.

In such a system that information recording and reproducing are conducted only for either grooves GB or lands LD, therefore, the stability of the focus servo loop can be maintained even in the case where such operation that a track is traversed occurs as in the time of seeking, for example.

In a system using both the grooves GB and the lands LD as the recording and reproducing tracks, there occurs such a state that the focus servo can be executed with stability to some extent without especially changing over the focus bias. Such processing as to change over the focus bias very rapidly at the time of, for example, seeking becomes unnecessary.

In which degree of range the relation between the direction of the astigmatism of the objective lens 5 and the direction of the astigmatism of the cylindrical lens 7 should be in order to obtain stability of the focus servo will now be considered.

Figure 6:
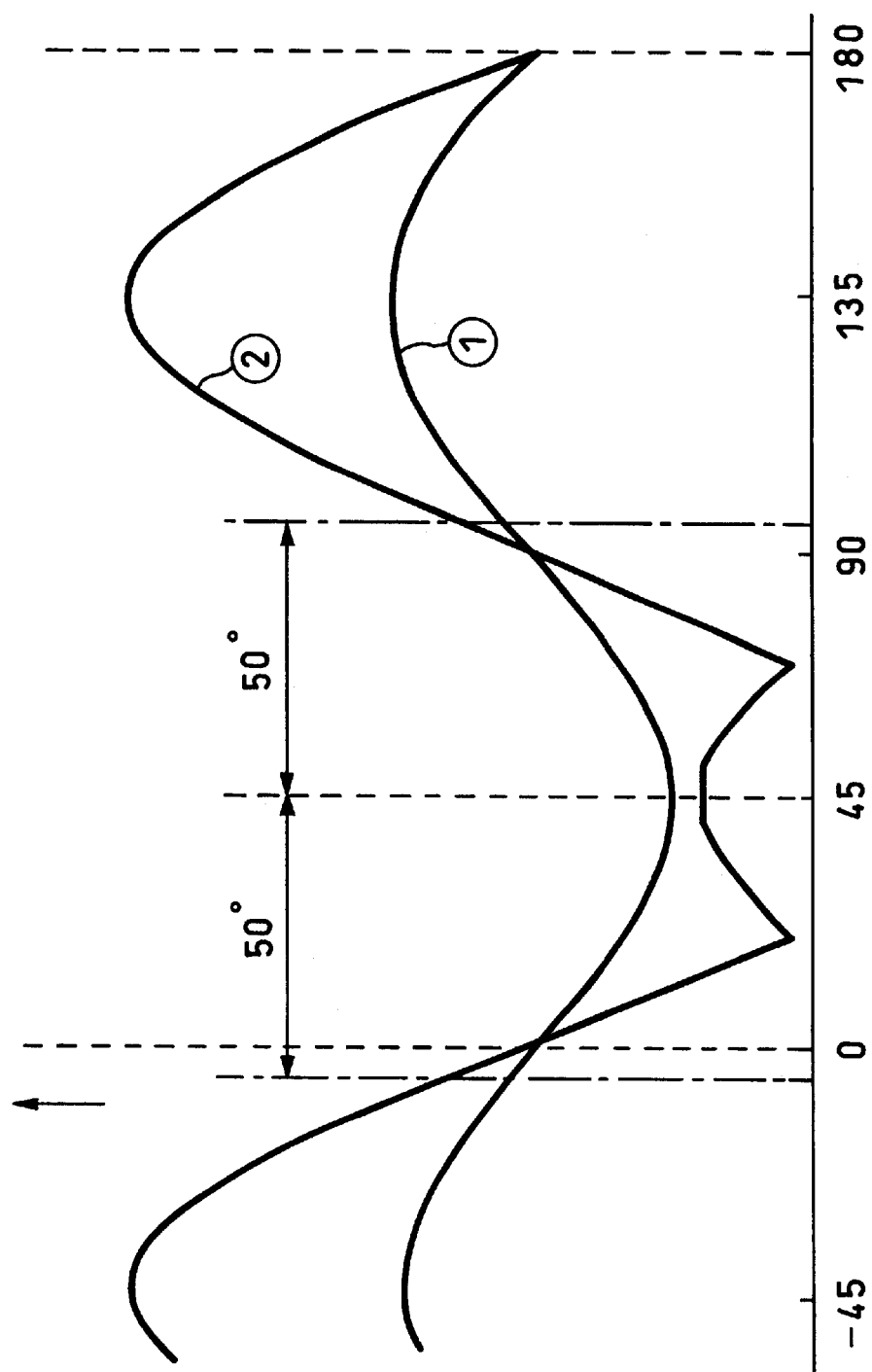
FIG. 6 is a schematic diagram of the relation between the astigmatism direction of the optical system and the astigmatism direction of a cylindrical lens.

FIG. 6 shows the level (degree of modulation) of the focus offset in accordance with the relation between the direction of the astigmatism of the cylindrical lens and the direction of the astigmatism of the objective lens.

On the axis of abscissas, 0° is the track line direction of the disk 90, and 4520 is the direction of the astigmatism of the cylindrical lens 7. Levels of the degree of modulation in the case where the direction of the astigmatism of the objective lens 5 is in the range of −45° to 180° are represented by curves (①) and (②).

Although only the range of −45°(=315°) to 180° is illustrated, the section of 180° to 360° is the same as the section of 0° to 180°.

The curves ① and ② represent patterns for different values of the astigmatism of the objective lens 5. The curve ① shows the case where the astigmatism is small, while the curve ② shows the case where the astigmatism is large.

In the case where the astigmatism is small, the degree of modulation becomes the minimum as represented by the curve ① when the direction of the astigmatism of the objective lens 5 is 45°, i.e., when the direction of the astigmatism of the objective lens 5 coincides with the direction of the astigmatism of the cylindrical lens as indicated as the direction DOB of FIG. 4B. On the contrary, the degree of modulation becomes the maximum when the direction of the astigmatism of the objective lens 5 is 135°, i.e., when the direction of the astigmatism of the objective lens 5 is perpendicular to the direction of the astigmatism of the cylindrical lens as indicated as the direction DOB' of FIG. 4B.

In the,case where the astigmatism is large to some extent, the degree of modulation becomes its minimum at angles deviated from 45° by ±22.5° as represented by the curve A. However, the degree of modulation becomes its maximum at 135° in the same way as the curve ①.

On the basis of such characteristics, the range of ±50 around 45° point can be regarded as the offset value of such a range as not to exert a bad influence upon the focus servo operation. Therefore, it is understood that the arranging direction of the objective lens 5 should be roughly set by taking the 45° point as the reference.

Figure 7:
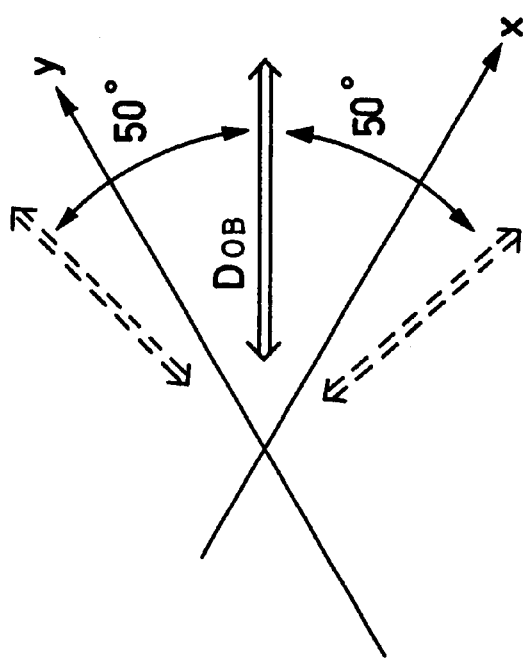
FIG. 7 is a schematic diagram of marking of an objective lens of the embodiment.
Figure 7:
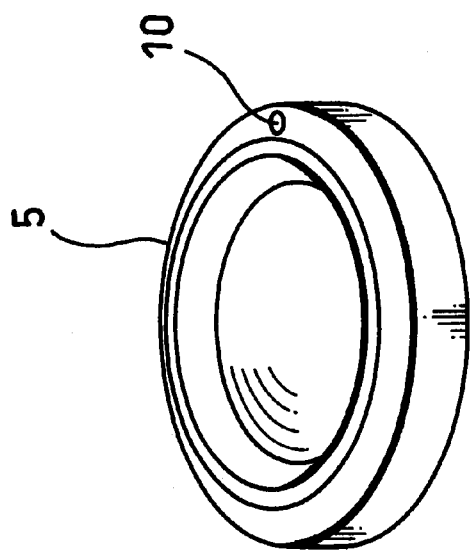

As shown in FIG. 7, for example, the objective lens 5 is provided with a marking 10 indicating the direction of the astigmatism thereof.

Figure 8A:
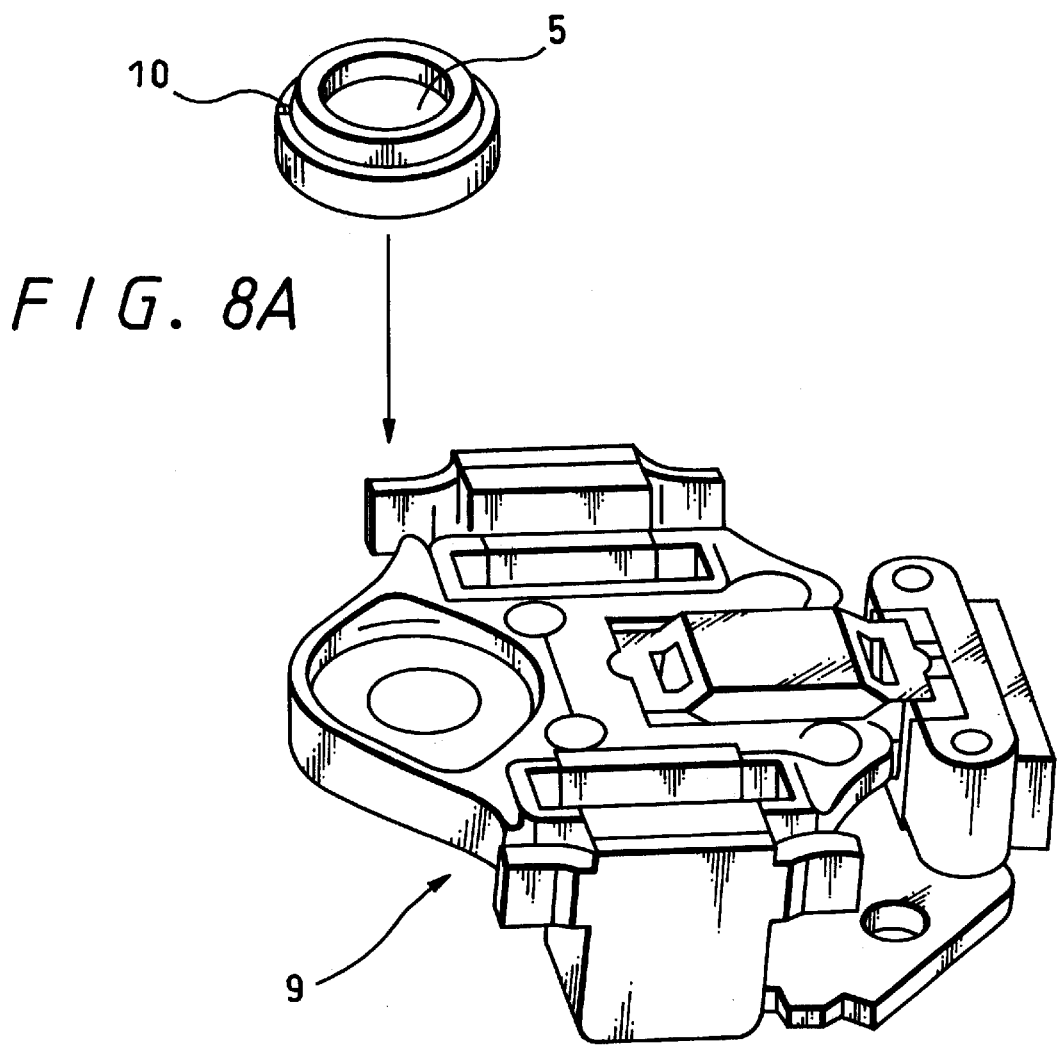
FIGS. 8A and 8B are schematic diagrams of assembling the objective lens in the embodiment.

Then, the objective lens 5 is disposed so as to make the direction of the astigmatism thereof grasped by the marking 10 coincide with the direction of the astigmatism of the cylindrical lens 7 known beforehand on the basis of the design. In other words, when attaching the objective lens 5 to the biaxial mechanism 9 as shown in FIG. 8A, the direction of attaching thereof is determined by using the marking 10 as the guide. And the objective lens 5 is fixed in that direction by means of adhesion or the like.

By doing so, the direction of the astigmatism of the objective lens 5 comes in the range of ±50° around the direction DOB shown in FIG. 7 without conducting very strict management of the objective lens attaching direction. As a result, the focus offset caused by the lands/grooves can be made such a level as not to affect the focus servo.

As for the method for providing the objective lens 5 with the marking 10 and attaching and fixing the objective lens 5 by using the marking 10 as the guide, various methods such as the following items [A] to [E] are conceivable.

[A] The astigmatism of a manufactured objective lens 5 is measured. A marking 10 indicating the direction of the astigmatism thereof determined by the measurement is given on the edge or the like of the objective lens 5 by means of, for example, ink or the like. By using the marking 10 as the guide, the objective lens 5 is attached and fixed to the biaxial mechanism 9.

[B] In the case where the objective lens 5 is molded, the direction of the astigmatism is nearly determined by its metal die.

For example, in the case of plastic mold, the direction of the astigmatism of the lens is determined with respect to the gate (injection port of fused plastic). Therefore, the metal die is designed beforehand so that a projection (or a recess) functioning as the marking will be formed at a certain position according to the gate position.

On the objective lens manufactured by the metal die, the marking 10 indicating the direction of the astigmatism of the lens is formed as the projection or recess. By using the projection or recess as the guide, therefore, the objective lens is attached.

Figure 8B:
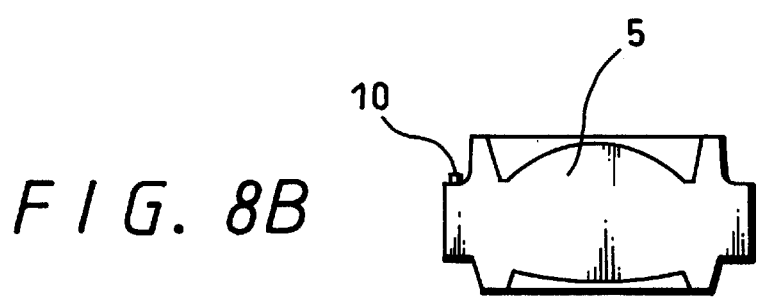

FIG. 8B shows an example in which the molded objective lens 5 has a projection formed on its edge as the marking 10.

[C] In the case where the objective lens is molded by the plastic molding, the direction of the astigmatism is determined by the gate position. Therefore, a gate trace left on the molded objective lens is used as the marking 10 as it is. In other words, the direction is determined by using the gate trace, and the objective lens 5 is attached.

[D] In the case where the objective lens 5 is molded by the glass molding, the direction of the astigmatism of the objective lens manufactured by its metal die can be known by measuring the metal die itself. According to the direction of the astigmatism grasped by the measurement of the metal die, therefore, the metal die is worked beforehand so as to form a projection (or a recess) functioning as the marking in some position of the objective lens.

On the objective lens manufactured by the metal die, the marking 10 indicating the direction of the astigmatism of the objective lens is formed as the projection or recess. By using the projection or recess as the guide, therefore, the objective lens is attached.

[E] In the case where the objective lens 5 is formed by glass molding, the direction of the astigmatism of the objective lens manufactured by that metal die can be also known by measuring the objective lens manufactured in the past by using the metal die. According to the direction of the astigmatism grasped by the measurement, therefore, the metal die is worked beforehand so as to form a projection (or a recess) functioning as the marking at a certain position of the objective lens. By using the marking 10 (the projection or recess) formed on the objective lens manufactured with the metal die as the guide, the objective lens is attached.

The various methods as heretofore described are conceivable. As a matter of course, however, other marking forming and attaching methods are also conceivable besides them.

Furthermore, in the case where the measurement of the objective lens and attaching thereof can be executed as a continuous process, it is not always necessary to form the marking 10.

As heretofore described, in an optical pickup according to the present invention in which a focus error information is obtained by the astigmatism system, the arranging state of an objective lens thereof is set so that a direction of astigmatism generated by the objective lens will be a direction in a predetermined range with respect to a direction of astigmatism generated by an astigmatism generating element. In particular, the predetermined angle range is made equal to an angle range of ±50° with respect to the direction of the astigmatism generated by the astigmatism generating element. As a result, the influence exerted on the focus error signal by lands/grooves or a train of pits forming a track on a recording medium can be minimized. This results in an effect that stable focus servo operation can be implemented and in the case of the land/groove recording system the unnecessity of the bias changeover can be implemented.

Furthermore, as a method for manufacturing an optical pickup, the astigmatism of a manufactured objective lens is measured, an arranging direction of the objective lens is determined so that the direction of the astigmatism thereof will be a direction in a predetermined range with respect to a direction of astigmatism generated by the astigmatism generating element set in the optical pickup, and the objective lens is attached and fixed. As a result, an optical pickup implementing the above described effect can be manufactured.

Furthermore, a metal die for manufacturing the objective lens by means of molding is prepared so as to form a marking portion indicating a direction of astigmatism of an objective lens on the objective lens. The objective lens is attached and fixed by using the marking portion as a guide. This results in an effect that the optical pickup of the present invention can be manufactured easily.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical pickup comprising:

a light source means;

an objective lens for irradiating and focusing a laser light output from said light source means on a recording face of an optical recording medium; and a quadruple light receiving means for receiving a reflected light from the optical recording medium via at least an astigmatism generating element in order to obtain a focus error signal from the reflected light, wherein said objective lens is arranged so that a direction of astigmatism generated by said objective lens is in a direction within a predetermined angular range with respect to a direction of astigmatism generated by said astigmatism generating element such, that an effect of modulation of focus error signal offset due to differing depths of features on the optical disk is maintained below a certain amount depending on the predetermined angular range and a value of astigmatism of the objective lens, and wherein said predetermined angular range is an angular range of ±50° with respect to the direction of astigmatism generated by said astigmatism generating element.

2. An optical pickup comprising:

a light source means;

an objective lens for irradiating and focusing a laser light output from said light source means on a recording face of an optical recording medium; and a quadruple light receiving means for receiving a reflected light from the optical recording medium via at least an astigmatism generating element in order to obtain a focus error signal from the reflected light, wherein said objective lens is arranged so that a direction of astigmatism generated by said objective lens is in a direction within a predetermined angular range with respect to a direction of astigmatism generated by said astigmatism generating element, such that an effect of modulation of focus error signal offset due to differing depths of features on the optical disk is maintained below a certain amount depending on the predetermined angular range and a value of astigmatism of the objective lens, and wherein said predetermined angular range is an angular range of 175° to 275° with respect to the direction of astigmatism generated by said astigmatism generating element.

3. The optical pickup of any claims 1 or 2, wherein said astigmatism generating element includes a cylindrical lens.

4. The optical pickup of any of claims 1 or 2, wherein said astigmatism generating element includes a beam splitter.

5. The optical pickup of any of claims 1 or 2, wherein said astigmatism generating element includes a cylindrical lens and a beam splitter.

6. The optical pickup of any of claims 1 or 2, wherein said light source means includes a laser diode.

7. The optical pickup of any of claims 1 or 2, wherein said objective lens is provided with a marking indicative of said direction of astigmatism of said objective lens.

8. The optical pickup of claim 7, wherein a linear extrapolation between a central portion of said objective lens and said marking lies within said predetermined angular range.

9. The optical pickup of claim 7, wherein said marking is provided on a holder of said objective lens.

10. The optical pickup of claim 7, wherein said marking is formed at a position corresponding to an injection port of material forming said objective lens from a die.

11. The optical pickup of claim 7, wherein said marking includes a gate trace left on said objective lens at a position corresponding to an injection port of material forming said objective lens from a die.

12. The optical pickup of any of claims 1 or 2, wherein said quadruple light receiving element is a quadruple light receiving photodetector.

13. The optical pickup of any of claims 1 or 2, wherein said features include land and grooves on said optical disk.

14. The optical pickup of any of claims 1 or 2, wherein said features include embossed pits.

* * * * *

UNITED STATES PATENT AND TRADEMARK OFFICE
CERTIFICATE OF CORRECTION

PATENT NO.     : 6,246,644 B1
DATED          : June 12, 2001
INVENTOR(S)    : Katsuhiro Seo It is certified that error appears in the above-identified patent and that said Letters Patent is hereby corrected as shown below:

Title page, Item [54], and Column 1, line 1,
Change "AND METHOD FOR MANUFACTURING OPTICAL PICKUP" to
-- HAVING REDUCED MODULATION EFFECT ON FOCUS ERROR SIGNAL OFFSET --.

Title page,
ABSTRACT, line 10, change "e.,g. (cylindrical" to -- (e.g., cylindrical --.

Column 1,
Line 22, delete "disk";
Line 34, delete "The"; change "operations" to -- Operations --;
Line 38, delete "," (first occurrence); and
Line 64, change "toward" to -- towards --.

Column 2,
Line 4, after "i.e." insert a comma;
Line 5, change "toward" to -- towards --; and
Line 14, delete "apart".

Column 3,
Line 8, change "lands" to -- land --;
Line 24, delete "far".

Column 5,
Line 2, change "to lens 5 the" to -- the lens 5 in --;
Line 23, delete "A";

Column 6,
Line 12, change "-1" to -- 1 --; and
Line 37, delete the comma.

Column 7,
Line 29, change "4520" to -- 45° --;
Line 33, delete "(";
Line 54, delete "," (first occurrence);
Line 56, change "A" to -- ② --.

UNITED STATES PATENT AND TRADEMARK OFFICE
CERTIFICATE OF CORRECTION

PATENT NO. : 6,246,644 B1
DATED : June 12, 2001
INVENTOR(S) : Katsuhiro Seo

It is certified that error appears in the above-identified patent and that said Letters Patent is hereby corrected as shown below:

Column 10,
Line 1, change "such," to -- , such --.

Signed and Sealed this

Twenty-third Day of April, 2002

Attest:

Attesting Officer

JAMES E. ROGAN
*Director of the United States Patent and Trademark Office*